United States Patent [19]

Senatore

[11] Patent Number: 4,476,273

[45] Date of Patent: Oct. 9, 1984

[54] THERMOSETTING COMPOSITIONS COMPRISING CONJUGATED DIENE POLYMERS HAVING PENDANT UNSATURATED GROUPS AND CALCIUM CARBONATE

[75] Inventor: Guy Senatore, Bartlesville, Okla.

[73] Assignee: Phillips Petroleum Company, Bartlesville, Okla.

[21] Appl. No.: 440,063

[22] Filed: Nov. 8, 1982

[51] Int. Cl.$^3$ .............................................. C08K 3/26
[52] U.S. Cl. ................................... 524/426; 523/212; 524/394; 524/399; 524/400; 524/425; 524/504; 524/517; 525/910; 525/914
[58] Field of Search ............... 524/426, 394, 399, 400, 524/425, 432, 433, 434, 436, 437, 444, 445, 449, 451, 504, 517; 523/212; 525/914, 910

[56] References Cited

U.S. PATENT DOCUMENTS

| | | | |
|---|---|---|---|
| 3,926,873 | 12/1975 | Aishima et al. | 260/18 R |
| 3,928,270 | 12/1975 | South, Jr. | 260/23.7 M |
| 4,082,817 | 4/1978 | Imaizumi et al. | 260/879 |
| 4,111,898 | 9/1978 | Inayoshi et al. | 260/42.53 |
| 4,117,036 | 9/1978 | Honda et al. | 260/878 |
| 4,371,635 | 2/1983 | Senatore | 524/426 |

Primary Examiner—Herbert J. Lilling
Attorney, Agent, or Firm—A. W. Umphlett

[57] ABSTRACT

Moldings having enhanced physical properties are made from compositions of a conjugated diene polymer, calcium carbonate and certain $\alpha,\beta$-unsaturated carboxylic modifiers.

18 Claims, No Drawings

THERMOSETTING COMPOSITIONS COMPRISING CONJUGATED DIENE POLYMERS HAVING PENDANT UNSATURATED GROUPS AND CALCIUM CARBONATE

BACKGROUND

It has become advantageous to employ high molecular weight polymers of at least one conjugated diene, and particularly high vinyl polybutadiene, in thermosetting compositions designed for injection molding as the highly filled compositions based on these high molecular weight polymers can be processed into a free-flowing form for facile addition to injection molding machines. However, the higher molecular weight conjugated diene polymers often have high compounded viscosities and their moldings sometimes have poor flexural and tensile properties. Various types of fillers have been evaluated as attenuators for these and other problems associated with high molecular weight conjugated diene polymers and their moldings.

INVENTION

The invention pertains to bulk molding compounds and adhesives based on conjugated diene polymers containing relatively high amounts of pendant unsaturated groups, and containing, as a filler, calcium carbonate and, as modifiers, either $\alpha,\beta$-unsaturated carboxylic anhydrides or $\alpha,\beta$-unsaturated monocarboxylic acids or their alkali metal or alkaline earth metal salts. Optionally, a polymerizable monovinyl-substituted aromatic compound, such as styrene, can be present in the formulation.

OBJECTS OF THE INVENTION

It is an object of the invention to provide improved thermosetting molding compositions based on conjugated diene polymers containing relatively high amounts of pendant unsaturated groups.

It is another object to provide a process for enhancing the physical properties, in particular the flexural and tensile properties, of moldings made from certain compositions based on conjugated diene polymers containing relatively high amounts of pendant unsaturated groups.

ADVANTAGES

Compositions produced in accordance with the invention have several advantages over polybutadiene-based compositions which do not contain the filler and modifiers of the invention. Specifically, the flexural modulus, flexural strength, and tensile break values of moldings made using the inventive compositions are significantly improved. Curing characteristics are also improved. Properties such as hardness, gloss, and shrinkage are maintained at acceptable values as well.

Other objects and advantages of the invention will be apparent from a study of the specification and claims.

DESCRIPTION OF THE INVENTION

The compositions of the invention contain, as essential ingredients, conjugated diene polymers containing relatively high amounts of pendant unsaturated groups, calcium carbonate, and a modifier which contains an $\alpha,\beta$-unsaturated carboxylic linkage. Other ethylenically unsaturated monomers can be included. Other additives, such as curing agents, reinforcing agents, processing aids, and coupling agents can also be used.

Conjugated Diene Polymers

The conjugated diene polymers which are suitable for use in the present invention include the polymers of at least one conjugated diene having from about 4 to about 10 carbon atoms per molecule. The polymers used contain relatively high amounts of pendant unsaturated groups; that is, they have at least about 50 percent, preferably more than about 60 percent, and most preferably from about 60 to about 90 percent of the unsaturation therein the form of pendant groups containing olefinic unsaturation. The conjugated diene polymer can be a linear or branched polymer or a radial polymer, and can be either predominantly amorphous or predominantly crystalline in nature.

In general the conjugated diene polymer will have a molecular weight in the range of from about 1000 to about 1,000,000 as determined by gel permeation chromatography, with a molecular weight in the range of about 5000 to about 300,000 being presently preferred. For most molding operations, a polybutadiene having an inherent viscosity in the range of about 0.25 to about 3, preferably in the range of about 0.3 to about 2, is particularly useful.

Suitable conjugated dienes include 1,3-butadiene; alkyl- and aryl-substituted-1,3-butadienes; 1,3-pentadiene; alkyl-substituted-1,3-pentadienes; and the like and admixtures thereof. 1,3-butadiene is presently preferred.

Exemplary conjugated diene polymers include polybutadiene, poly(1-phenylbutadiene), poly(1-isopropyl-2-methylbutadiene), poly(2-methyl-1,3-pentadiene), polyisoprene, polypentadiene, copolymers of 1,3-butadiene and 1-phenyl-1,3-butadiene, copolymers of 1,3-butadiene and isoprene, copolymers of 1,3-butadiene and styrene, and the like, and blends thereof. Random and block copolymers are operable.

Mixtures of diene polymers can be employed.

Ethylenically Unsaturated Monomers

Unsaturated monomers other than the carboxylic modifiers used herein are optional ingredients in the inventive formulations. Generally, monovinyl substituted aromatics are employed as unsaturated monomers.

Polymerizable monovinyl substituted aromatic compounds optionally employed in the inventive formulations will generally contain from about 8 to about 12 carbon atoms per molecule. Useful monomers include styrene, divinylbenzene, diallyl phthalate, acrylic and methacrylic acids, and esters of such acids. Styrene and substituted styrenes, such as $\alpha$-methylstyrene, p-methylstyrene, vinyl toluene, and the like are preferred. Mixtures of monomers can be employed.

Calcium Carbonate

The calcium carbonate used herein can be any commercially available type. Generally, they will have particle sizes of about 0.01 to about 100 microns with about 0.1 to about 10 microns preferred. A preferred calcium carbonate is Gama-Sperse 6451, Georgia Marble Company, a wet-ground calcium carbonate with average particle size of 5 microns.

Modifiers

The modifiers used in carrying out the invention will contain at least one $\alpha,\beta$-ethylenically unsaturated carboxylic group, i.e., at least one linkage corresponding to the formula

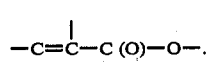
(I)

The modifiers fall into two categories: acid anhydrides, and monoacids or salts of monoacids. It is preferred that the modifiers employed be ones whose compatibility with the polymer compositions are such that they can be thoroughly dispersed therein before molding. Such thorough dispersion can be facilitiated by suitable mixing techniques, such as mixing above the melting point of the modifier or using a polymerizable monomer which is capable of dissolving the modifier.

Suitable $\alpha,\beta$-unsaturated carboxylic anhydrides include cyclic or acyclic carboxylic anhydrides generally containing from about 4 to about 18 carbon atoms per molecule and also containing at least one $\alpha,\beta$-unsaturated group corresponding to the general formula above. Suitable anhydrides generally contain from 4 to about 12 carbon atoms. Because of availability and reactivity, it is presently preferable to employ $\alpha,\beta$-unsaturated carboxylic species containing from 4 to about 8 carbon atoms per molecule.

Suitable anhydrides include maleic anhydride, citraconic anhydride (2-methylmaleic anhydride), itaconic anhydride (2-methylenesuccinic anhydride), 2-ethylmaleic anhydride, 2-n-butylmaleic anhydride, 3-methyl-2-methylenesuccinic anhydride, 3-n-butyl-2-methylenesuccinic anhydride, acrylic anhydride, methacrylic anhydride, 2-butenoic anhydride, 2-hexenoic anhydride, 2-octenoic anhydride, 2-methyl-2-pentenoic anhydride, and the like, and mixtures thereof. Maleic anhydride is preferred.

It has been found that compositions containing styrene monomer and at least one of maleic, itaconic, and citraconic anhydrides have an unexpected adhesive property, i.e., they adhere to the surfaces they contact during curing.

Suitable $\alpha,\beta$-unsaturated monocarboxylic acids for use in this invention include those containing from about 3 to about 18 carbon atoms per molecule. Because of availability and reactivity, it is presently preferable to employ those unsaturated monoacids containing from about 3 to about 8 carbon atoms per molecule. Examples of specific unsaturated monoacids useful in this invention include acrylic acid, methacrylic acid, 2-butenoic acid, 2-pentenoic acid, 2-octenoic acid, 2-decenoic acid, 2-tridecenoic acid, 2-octadecenoic acid, 4,4,6-trimethyl-2-dodecenoic acid, and the like, and mixtures thereof. Acrylic acid is preferred.

It is also within the scope of this invention to include Group IA, Group IIA, or Group IIB metal salts of these unsaturated monoacids. For example, the lithium, sodium, potassium, magnesium, calcium, or zinc salts of the above described monoacids can be employed. Mixtures of salts can be employed.

Combinations of any two or more modifiers are operable.

The $\alpha,\beta$-unsaturated carboxylic anhydrides, or the $\alpha,\beta$-unsaturated monocarboxylic acids, or their salts can be employed in the inventive bulk molding formulations in whatever amounts produce the improvements discussed herein. It is generally advantageous to employ from about 0.1 to about 20 parts by weight (pbw) per 100 parts by weight of conjugated diene polymer, though it is presently preferable to employ from about 0.5 to about 12 parts by weight per 100 parts by weight of high vinyl polybutadiene.

Other Ingredients

A variety of other ingredients such as curing agents, reinforcers, processing aids, coupling agents, mold release agents, preservatives, low shrinkage additives, and the like, are useful herein.

Curing Agents

The thermosetting molding compositions of the invention include at least one free radical generating compound as a curing agent for the conjugated diene polymer. Useful compounds include peroxy compounds. Suitable organic peroxy compounds include the hydrocarbyl hydroperoxides, dihydrocarbyl peroxides, and the peroxy esters, preferably containing up to about 30 carbon atoms per molecule. Exemplary organic peroxy compounds include tert-butyl peroxybenzoate, tert-butyl hydroperoxide, di-tert-butyl peroxide, dicumyl peroxide, tert-butyl-peroxy isopropyl carbonate, n-butyl-4,4-bis(tert-butylperoxy)valerate, $\alpha,\alpha'$-bis(tert-butylperoxy)diisopropylbenzene, 2,5-di-methyl-2,5-bis(-tert-butylperoxy)hexane, 2,5-dimethyl-2,5-bis(tert-butylperoxy)-3-hexyne, 2,5-dimethyl-2,5-dihydroperoxyhexane, and the like and admixtures thereof. $\alpha,\alpha'$-Bis(-tert-butylperoxy)diisopropylbenzene is highly preferred.

Reinforcing Agents

While the use of calcium carbonate is essential to the invention, the use of other reinforcers and/or fillers is contemplated. Fillers of a variety of shapes, e.g., fibers, particles, spheres, can be employed herein. One preferred group of reinforcers are siliceous fibers, such as asbestos and glass. Chopped glass fibers are highly preferred.

Non-fibrous fillers, such as non-fibrous glass, silica, carbon, talc, mica, wollastonite, clay, and the like, can be used.

Mixtures of fillers, including mixtures containing colorants and/or polymeric fillers, are operable.

Processing Aids

The thermosetting molding composition of the invention can include processing aids, examples of which include metal carboxylates such as calcium and zinc stearates, naturally occurring and synthetic waxes, such as beeswax, ceresin, Fischer-Tropsch wax, microcrystalline wax, polyethylene wax; amides such as erucamide, oleamide, stearamide, ethylene bis(stearamide) and the like, and admixtures thereof. One preferred additive is a crosslinkable plasticizer known as Saret 515®, a mixed acrylate/methacrylate ester of a polyfunctional alcohol.

These processing aids, which are employed to facilitate handling, e.g., to reduce apparent viscosity of the molding composition or improve mold release properties, will generally be present, when employed, in an amount in the range of about 1 to about 8 parts by weight per 100 parts by weight of the polymer, preferably in the range of about 2 to about 4 parts by weight per 100 parts by weight of the polymer.

The use of polymeric additives is also contemplated. Generally, these additives, when present, will be used in minimal quantities. Minor amounts, based on the quantity of diene polymer matrix, are preferred. One useful additive is a maleic anhydride-modified medium-vinyl polybutadiene commercially termed "Lithene PM25MA". Atactic polypropylene and polyisobutylene are among the useful polymeric additives for reducing mold shrinkage. Mixtures of such additives can be employed.

Coupling Agents

Coupling agents promote the adhesion of the polymeric matrix and filler(s) used. Generally, operable coupling agents will be those compounds which enhance the compatibility of the polybutadiene and calcium carbonate ingredients. Operable coupling agents include the silicon, titanium, phosphorous, and boron compounds whose utility as coupling agents is known in the art. Silicon compounds, silanes in particular, are preferred.

The silanes which can be employed as coupling agents in accordance with the present invention include tris(2-methoxyethoxy)vinylsilane, vinyltriethoxysilane, $\beta$-(3,4-epoxycyclohexyl)ethyltrimethoxysilane, $\gamma$-glycidoxypropyltrimethoxysilane, $\gamma$-aminopropyltriethoxysilane, $\gamma$-mercaptopropyltrimethoxysilane, vinyltriacetoxysilane, N-$\beta$-(aminoethyl)-$\gamma$-aminopropyltrimethoxysilane, $\gamma$-methacryloxypropyltrimethoxysilane, and the like, and mixtures thereof. $\gamma$-Methacryloxypropyltrimethoxysilane is a preferred coupling agent. It is highly preferred when glass reinforcement is employed.

Other additives including antioxidants, pigments, antistatic agents, and the like, can also be employed in the thermosetting molding compositions.

The amounts of components in the inventive formulations will generally be within the ranges set out on the following table.

| Component | Broad (pbw) | Preferred (pbw) |
| --- | --- | --- |
| High Vinyl Polybutadiene | 100 | 100 |
| Calcium carbonate | 2–1200 | 100–800 |
| Modifier of the Invention | 0.05–20 | 0.1–10 |
| Styrene | 0–100 | 0–70 |
| Peroxide | 0.5–10 | 1–6 |
| Reinforcing Agent | 0–400 | 50–300 |
| Processing Aid | 0–10 | 1–5 |
| Coupling Agent | 0–10 | 0.5–5 |

The ranges given above are merely suggestions. Other suitable amounts can be determined by routine experimentation.

The components of the thermosetting molding composition should be uniformly mixed prior to molding. This can be done in any manner known in the art. For example, the blend ingredients can be mixed in a Plastograph such as that manufactured by the C. W. Brabender Company, and then further homogenized on a roll mill. In both the Plastograph and roll mill operations, elevated temperatures may be employed. However, the temperature employed should be below the activation temperature for the peroxide curing agent in order to avoid premature curing of the blend. A Banbury mixer or other types of mixing devices can also be employed to mix the ingredients of the thermosetting compositions.

The thermosetting compositions of the invention can be molded and cured at elevated temperatures, for example, from about 130° to about 200° C. for a period of time in the range of about 30 seconds to about 1 hour. Compression and injection molding are among the operable molding techniques.

The following examples are presented in further illustration of the invention and should not be construed an undue limitation thereof.

EXAMPLE I

The following bulk molding compounds were prepared with the presence or absence of carboxylic anhydrides according to the recipe:

| Component | Parts by Weight |
| --- | --- |
| High vinyl polybutadiene[1] | 100 (90 in runs 3–6) |
| Calcium Carbonate[2] | 400 |
| Zinc Stearate[3] | 2 |
| Coupling Agent[4] | 1 |
| Peroxide[5] | 5 (2 active) |
| Reinforcement[6] | 88 |
| Acid Anhydride | 10 (Runs 3–6) |

[1] Mn = 10,500, 66% vinyl content (Phillips Petroleum Company).
[2] Gama-Sperse 6451 (Georgia Marble).
[3] Synpro ABG (Synthetic Products, a division of Dart Industries).
[4] Silane A-174 (Union Carbide), $\gamma$-Methacryloxy-propyltrimethoxysilane.
[5] Percadox 14/40 (Noury Chemical), 40% $\alpha,\alpha'$-bis(tert-butylperoxy)diisopropylbenzene on talc.
[6] Chopped glass strand 832 BC (Owens Corning), one-fourth inch length, 15 wt. % based on total composition.

Properties of molded test specimens are given in Table I.

It has been found that molding conducted at 177° C. and 1100 psi for 5 minutes generally gives optimum properties (see comparative run 1). However, in order to accentuate differences between comparative and inventive runs, runs 2–6 were conducted with a molding temperature of 163° C. The data in Table I demonstrate that maleic anhydride and citraconic anhydride added to bulk molding compounds gave significantly higher flexural modulus, flexural strength, tensile break, and hardness than runs 2, 3 and 4 which employed either no acid anhydride or acid anhydrides without $\alpha,\beta$-unsaturation.

TABLE I

| | | | | | Properties | | |
| --- | --- | --- | --- | --- | --- | --- | --- |
| Run No. | Anhydride[a] | Flex. Mod.,[b] MPa | Flex. Str.,[c] MPa | Tens. Break,[d] MPa | Notched[e] Izod Impact, J/M | Barcol[f] Hardness | Shrinkage[i] mm/m |
| 1 (comp)[j] | none | 5191 | 71.6 | 35.6 | 158 | 22–50 | 1.0 |
| 2 (comp)[k] | none | 3634 | 55.8 | 26.0 | 179 | 0–14 | 0.1 |
| 3 (comp) | CDCA[l] | 3827 | 29.7 | 20.9 | 120 | 0–36 | 0.8 |
| 4 (comp) | BHDA[m] | 3144 | 40.5 | 19.3 | 182 | 0–25 | 1.5 |
| 5 (inv) | CA[n] | 7074 | 67.7 | 30.2 | 185 | 50–59 | 1.6 |

TABLE I-continued

| Run No. | An-hydride[a] | Flex. Mod.,[b] MPa | Flex. Str.,[c] MPa | Tens. Break,[d] MPa | Notched[e] Izod Impact, J/M | Barcol[f] Hardness | Shrinkage[i] mm/m |
|---|---|---|---|---|---|---|---|
| 6 (inv) | MA[o] | 9639 | 69.8 | 29.9 | 185 | 62-69 | 4.2 |

[a] 10 parts by weight where employed per 90 parts by weight polybutadiene.
[b] Flexural modulus (ASTM D-790)
[c] Flexural strength (ASTM D-790)
[d] Tensile break (ASTM D-638)
[e] Notched Izod impact strength (ASTM D-256)
[f] Barcol hardness (ASTM D-2583, using a GY26934-1 Barcol Hardness Tester manufactured by Barker-Coleman)
[i] Mold shrinkage (determined at least 24 hours after molding by measuring the width of the cold molded slab and the width of the cold metal mold, given as the ratio of the width difference divided by the width of the cold mold.)
[j] Molded at 177 Degrees C., 1100 psi, 5 minutes.
[k] Molded at 163 Degrees C., 1100 psi, 5 minutes.
[l] Cis-4-cyclohexene-1,2-dicarboxylic anhydride
[m] Bicyclohept-5-ene-2,3-dicarboxylic anhydride
[n] Citraconic anhydride
[o] Maleic anhydride

EXAMPLE II

The following runs were conducted comparing bulk molding compounds also containing styrene according to the following recipe:

| Components | Parts by Weight |
|---|---|
| High vinyl polybutadiene[1] | Variable |
| Styrene | Variable |
| Acid Anhydride | Variable |
| Calcium Carbonate[2] | 400 |
| Zinc Stearate[3] | 2 |
| Coupling Agent[4] | 1 |
| Peroxide[5] | 2 |
| Reinforcement[6] | 88 |

[1] Mn = 21,500, 83% vinyl, (Phillips Petroleum Company).
[2] Gama-Sperse 6451 (Georgia Marble).
[3] Synpro ABG (Synthetic Products, a division of Dart Industries).
[4] Silane A-174 (Union Carbide). γ-Methacryloxypropyltrimethoxysilane.
[5] Percadox 14/40 (Noury Chemical), 40% α,α'-bis(tert-butylperoxy)isopropylbenzene on talc.
[6] Chopped glass strand 832 BC (Owens Corning), one-fourth inch length, 15 wt. % based on total composition.

The physical properties of test specimens molded at 163° C. and 1100 psia for 5 minutes are given in Table II.

should also be noted that mold shrinkage was higher in the inventive runs than the compartive run.

EXAMPLE III

The following runs were conducted preparing bulk molding compounds containing acrylic acid, salts of acrylic acid or salts of methacrylic acid according to the following recipe:

| Component | Parts by Weight |
|---|---|
| High vinyl polybutadiene[1] | 70 |
| Styrene | 30 |
| Acid or salt | Variable |
| Calcium Carbonate[2] | 400 |
| Zinc Stearate[3] | 2 |
| Coupling Agent[4] | 0.5 |
| Peroxide[5] | 2 |
| Reinforcement[6] | 88 |

[1] For runs 16-20, Mn = 20,500, 68% vinyl, (Phillips Petroleum Co.). For runs 21-43, Mn = 24,700, 56% vinyl, (Phillips Petroleum Co.).
[2] Gama-Sperse 6451 (Georgia Marble).
[3] Synpro ABG (Synthetic Products, a division of Dart Industries).
[4] Silane A-174 (Union Carbide), γ-Methacryloxypropyltrimethoxysilane.
[5] Vulcup R (Hercules), α,α'-bis(tert-butylperoxy)diisopropylbenzene.
[6] Chopped glass strand 832 BC (Owens Corning), one-fourth inch length, 15 wt. % based on total composition.

TABLE II

| Run No. | HVPB[a] pbw | Styrene, pbw | An-hydride | Amt, pbw | Flex. mod. MPa | Flex. Str. MPa | Tens. Break MPa | Notched Izod Impact J/M | Barcol Hardness | Shrinkage mm/m |
|---|---|---|---|---|---|---|---|---|---|---|
| 7 | 70 | 30 | None | 0 | 7736 | 99.5 | 24.7 | 200 | 29-44 | 1.1 |
| 8 | 69 | 29 | MA[b] | 2 | 10763 | 50.5 | 26.6 | 165 | 55-59 | 3.5 |
| 9 | 67 | 28 | MA | 5 | 11715 | 60.3 | 22.8 | 124 | 51-59 | 4.4 |
| 10 | 69 | 29 | CA[c] | 2 | 9115 | 80.5 | 21.2 | 168 | 45-56 | 2.3 |
| 11 | 67 | 28 | CA | 5 | 10653 | 59.6 | 24.3 | 145 | 49-60 | 3.2 |
| 12 | 69 | 29 | IA[d] | 2 | 11101 | 58.3 | 20.7 | 160 | 52-60 | 3.1 |
| 13 | 67 | 28 | IA | 5 | 11225 | 63.8 | 28.5 | 178 | 54-64 | 5.2 |
| 14 | 69 | 29 | MAA[e] | 2 | 9350 | 51.6 | 18.1 | 208 | 44-60 | 2.5 |
| 15 | 67 | 28 | MAA | 5 | 10487 | 63.6 | 28.9 | 206 | 52-59 | 3.2 |

[a] High vinyl polybutadiene
[b] Maleic anhydride
[c] Citraconic anhydride
[d] Itaconic anhydride
[e] Methacrylic anhydride It will be observed from the results in Table II that all runs employing maleic anhydride, citraconic anhydride, itaconic anhydride, or methacrylic anhydride resulted in significantly higher flexural modulus and hardness compared to a formulation without such additives. It Physical properties of molded test specimens are included in Table III.

The results in Table III demonstrate that bulk molding compounds containing acrylic acid, calcium acrylate, sodium methacrylate, calcium methacrylate, and zinc methacrylate exhibited higher flexural modulus than comparative runs containing no acid compound. Sodium acrylate did not show the expected improvement in flexural modulus for reasons that are not fully understood. Again, mold shrinkage was higher for inventive formulations than for the comparative runs.

-continued

| Component | Parts by Weight |
|---|---|
| Reinforcement[6] | 88 |

[1]For runs 44-59, Mn = 21,500, 83% vinyl, (Phillips Petroleum Co.). For runs 60-65,

TABLE III

| | | | Properties | | | | | |
|---|---|---|---|---|---|---|---|---|
| Run No. | Acid | Amt, pbw | Flex. Mod MPa | Flex Str. MPa | Tens. Break Mpa | Notched Izod Impact J/M | Barcol Hardness | Shrinkage mm/m |
| 16 | None | 0 | 7439 | 73.9 | 34.0 | 127 | 23-40 | 1.5 |
| 17 | AA[a] | 0.5 | 13538 | 104.3 | 41.7 | 195 | 55-61 | 2.8 |
| 18 | AA[a] | 1 | 14361 | 121.2 | 38.1 | 204 | 55-63 | 3.3 |
| 19 | AA[a] | 2 | 13732 | 108.0 | 45.2 | 178 | 55-60 | 2.6 |
| 20 | AA[a] | 4 | 13143 | 98.5 | 47.1 | 202 | 50-65 | 3.8 |
| 21 | None | 0 | 6861 | 58.9 | 33.3 | 189 | 37-52 | 0.83 |
| 22 | CAA[b] | 1 | 7978 | 69.9 | 30.3 | 191 | 44-54 | 1.0 |
| 23 | CAA[b] | 3 | 8970 | 70.0 | 30.8 | 211 | 50-59 | 2.7 |
| 24 | CAA[b] | 5 | 10336 | 88.1 | 34.1 | 202 | 50-62 | 3.2 |
| 25 | CAA[b] | 10 | 10887 | 92.7 | 40.3 | 190 | 59-65 | 3.5 |
| 26 | None | 0 | 7729 | 69.1 | 22.5 | 225 | 42-48 | 0.92 |
| 27 | SA[c] | 1 | 7536 | 87.5 | 40.0 | 208 | 42-56 | 1.1 |
| 28 | SA[c] | 3 | 7557 | 68.3 | 32.3 | 189 | 38-50 | 1.6 |
| 29 | SA[c] | 5 | 7771 | 63.0 | 26.0 | 208 | 47-55 | 1.9 |
| 30 | SA[c] | 10 | 8384 | 63.4 | 30.6 | 233 | 50-59 | 1.8 |
| 31 | None | 0 | 7343 | 77.1 | 33.8 | 180 | 39-46 | 0.58 |
| 32 | SMA[d] | 1 | 7281 | 64.2 | 23.7 | 173 | 40-49 | 0.92 |
| 33 | SMA[d] | 3 | 8522 | 58.7 | 25.5 | 201 | 43-53 | 1.67 |
| 34 | SMA[d] | 5 | 9729 | 80.5 | 27.5 | 202 | 43-54 | 1.50 |
| 35 | SMA[d] | 10 | 10363 | 90.4 | 52.7 | 219 | 47-57 | 2.17 |
| 36 | None | 0 | 6798 | 64.7 | 34.6 | 176 | 43-52 | 1.33 |
| 37 | CMA[e] | 1 | 7350 | 64.2 | 17.9 | 160 | 44-54 | 1.42 |
| 38 | CMA[e] | 3 | 8109 | 77.5 | 34.9 | 196 | 52-60 | 1.50 |
| 39 | CMA[e] | 5 | 7784 | 58.1 | 36.1 | 162 | 43-49 | 1.67 |
| 40 | CMA[e] | 10 | 7185 | 47.5 | 30.0 | 172 | 43-53 | 1.75 |
| 41 | ZMA[f] | 1 | 7447 | 57.9 | 33.8 | 180 | 42-50 | 0.75 |
| 42 | ZMA[f] | 3 | 8412 | 84.3 | 51.3 | 197 | 45-55 | 1.67 |
| 43 | ZMA[f] | 5 | 7874 | 69.8 | 23.2 | 185 | 40-49 | 1.33 |

[a]Acrylic acid
[b]Calcium acrylate
[c]Sodium acrylate
[d]Sodium methacrylate
[e]Calcium methacrylate
[f]Zinc methacrylate

EXAMPLE IV

In the following non-inventive runs bulk molding compounds were prepared employing a variety of carboxylic acids and acid derivatives according to the following recipe:

| Component | Parts by Weight |
|---|---|
| High Vinyl Polybutadiene[1] | 70 |
| Styrene | 30 |
| Acid Compound | Variable |
| Calcium Carbonate[2] | 400 |
| Zinc Stearate[3] | 2 |
| Coupling Agent[4] | 0.5 |
| Peroxide[5] | 2 |

Mn = 24,700, 56% vinyl, (Phillips Petroleum Co.).
[2]Gama-Sperse 6451 (Georgia Marble).
[3]Synpro ABG (Synthetic Products, a division of Dart Industries).
[4]Silane A174 (Union Carbide) -γα-methacryloxypropyltrimethoxysilane.
[5]Percadox 14/40 (Noury Chemical), 40% α,α'-bis(tert-butylperoxy)diisopropylbenzene.
[6]Chopped glass strand 832-BC (Owens Corning), one-fourth inch length, 15 wt. % based on total composition.

The physical properties of test specimens molded at 163° C. and 1100 psia for 5 minutes are given in Table IV.

The data in Table IV demonstrate that dicarboxylic acids, fumaric acid and maleic acid, as well as various carboxylic esters, carboxylic amides and carboxylic imides do not result in the improvement in flexural modulus which is observed in the inventive runs of Examples I, II and III.

Reasonable variations, such as those which would occur to the skilled person, can be made herein without departing from the scope of the invention.

TABLE IV

| | | | Properties | | | | | |
|---|---|---|---|---|---|---|---|---|
| Run No. | Unsat'd Comp. | Amt | Flex. Mod MPa | Flex Str. MPa | Tens. Break MPa | Notched Izod Impact J/M | Barcol Hardness | Shrinkage mm/m |
| 44 | None | 0 | 7385 | 66.5 | 36.6 | 171 | 36-48 | 1.75 |
| 45 | FA[a] | 2.2 | 7516 | 76.9 | 19.7 | 211 | 44-54 | 2.25 |
| 46 | FA[a] | 5.6 | 7005 | 61.0 | 23.9 | 175 | 38-54 | 1.42 |
| 47 | Fa[a] | 10.3 | 7909 | 56.9 | 21.2 | 131 | 46-60 | 3.25 |

TABLE IV-continued

| Run No. | Unsat'd Comp. | Amt | Flex. Mod MPa | Flex. Str. MPa | Tens. Break MPa | Notched Izod Impact J/M | Barcol Hardness | Shrinkage mm/m |
|---|---|---|---|---|---|---|---|---|
| 48 | DBF[b] | 2.0 | 8371 | 58.1 | 20.8 | 231 | 44–54 | 1.33 |
| 49 | DBF[b] | 5.0 | 7833 | 62.8 | 24.7 | 205 | 32–45 | 2.83 |
| 50 | MAC[c] | 5.0 | Did not flow together during molding therefore discarded | | | | | |
| 51 | DBM[d] | 2.0 | 7791 | 56.7 | 16.8 | 206 | 38–47 | 1.50 |
| 52 | DBM[d] | 5.0 | 7874 | 67.5 | 17.4 | 218 | 33–48 | 1.25 |
| 53 | None | 0 | 7722 | 66.6 | 26.0 | 175 | 34–43 | 1.58 |
| 54 | ACA[e] | 2.0 | 7571 | 59.4 | 17.6 | 200 | 43–52 | 0.92 |
| 55 | ACA[e] | 5.0 | 8267 | 71.0 | 24.4 | 229 | 44–54 | 0.75 |
| 56 | DMACA[f] | 2.0 | 8046 | 68.6 | 24.4 | 262 | 39–48 | 0.67 |
| 57 | DMACA[f] | 5.0 | 8453 | 58.4 | 23.0 | 202 | 38–49 | 1.17 |
| 58 | DMAEMA[g] | 2.0 | 8157 | 56.0 | 29.6 | 193 | 32–48 | 1.25 |
| 59 | DMAEMA[g] | 5.0 | 8495 | 68.2 | 25.6 | 212 | 37–50 | 2.25 |
| 60 | None | 0 | 6599 | 59.0 | 27.0 | 166 | 41–47 | 0.92 |
| 61 | MI[h] | 1 | 6909 | 69.1 | 34.2 | 172 | 36–46 | 0.75 |
| 62 | MI[h] | 3 | 6667 | 59.8 | 22.0 | 151 | 31–47 | 0.83 |
| 63 | NPMI[i] | 1 | 6778 | 51.0 | 35.8 | 198 | 34–44 | 1.08 |
| 64 | NPMI[i] | 3 | 7116 | 58.1 | 31.8 | 165 | 36–48 | 1.25 |
| 65 | NPMI[i] | 5 | 6371 | 67.1 | 31.0 | 208 | 29–44 | 0.67 |

[a]Fumaric acid
[b]Di-n-butyl fumarate
[c]Maleic acid
[d]Di-n-butyl maleate
[e]Acrylamide
[f]N,N—dimethylacrylamide
[g]2-Dimethylaminoethyl methacrylate
[h]Maleimide
[i]N—phenylmaleimide

I claim:

1. A thermosetting composition consisting essentially of:
    (a) 100 parts by weight of a conjugated diene polymer containing a relatively high amount of pendant unsaturated groups:
    (b) 0–100 parts by weight of an ethylenically unsaturated monomer;
    (c) 2–1200 parts by weight calcium carbonate; and
    (d) a properties-enhancing amount of at least one modifier which contains one or more —C=C—C(O)—O— linkages and which is selected from the group consisting of acid anhydrides, monoacids, and alkali metal or alkaline earth metal salts of monoacids.

2. The composition of claim 1 additionally containing a curing agent.

3. The composition of claim 2 additionally containing a reinforcing agent, at least one processing aid, and a coupling agent.

4. The composition of claim 2 wherein (a) is a high-vinyl polybutadiene.

5. The composition of claim 4 wherein the modifier (d) is selected from the group consisting of: maleic anhydride, citraconic anhydride, itaconic anhydride, methacrylic anhydride, acrylic acid, methacrylic acid, calcium acrylate, sodium acrylate, calcium methacrylate, sodium methacrylate, and zinc methacrylate.

6. The composition of claim 4 wherein the modifier (d) is acrylic acid.

7. The composition of claim 4 wherein the modifier (d) is maleic anhydride.

8. A process for improving the flexural modulus, flexural strength, and tensile break of moldings from a thermosetting composition based on calcium carbonate-filled conjugated diene polymer containing a relatively high amount of pendant unsaturated groups comprising the step of employing in that composition a properties-enhancing amount of at least one modifier which contains one or more —C=C—C(O)—O— linkages and which is selected from the group consisting of acid anhydrides, monoacids, and alkali metal or alkaline earth metal salts of monoacids.

9. The process of claim 8 wherein the conjugated diene polymer is a high vinyl polybutadiene.

10. The process of claim 9 wherein the modifier is selected from the group consisting of maleic anhydride, citraconic anhydride, itaconic anhydride, methacrylic anhydride, acrylic acid, methacrylic acid, calcium acrylate, sodium acrylate, calcium methacrylate, sodium methacrylate and zinc methacrylate.

11. The process of claim 9 wherein the modifier is acrylic acid.

12. The process of claim 9 wherein the modifier is maleic anhydride.

13. The composition of claim 1 containing about 0.05–20 parts by weight of component (d).

14. The composition of claim 5 containing about 0.05–20 parts by weight of component (d).

15. The process of claim 11 wherein the composition additionally contains a curing agent.

16. The process of claim 15 wherein the composition additionally contains a reinforcing agent, at least one processing aid, and a coupling agent.

17. The process of claim 12 wherein the composition additionally contains a curing agent.

18. The process of claim 17 wherein the composition additionally contains a reinforcing agent, at least one processing aid, and a coupling agent.

* * * * *